UNITED STATES PATENT OFFICE.

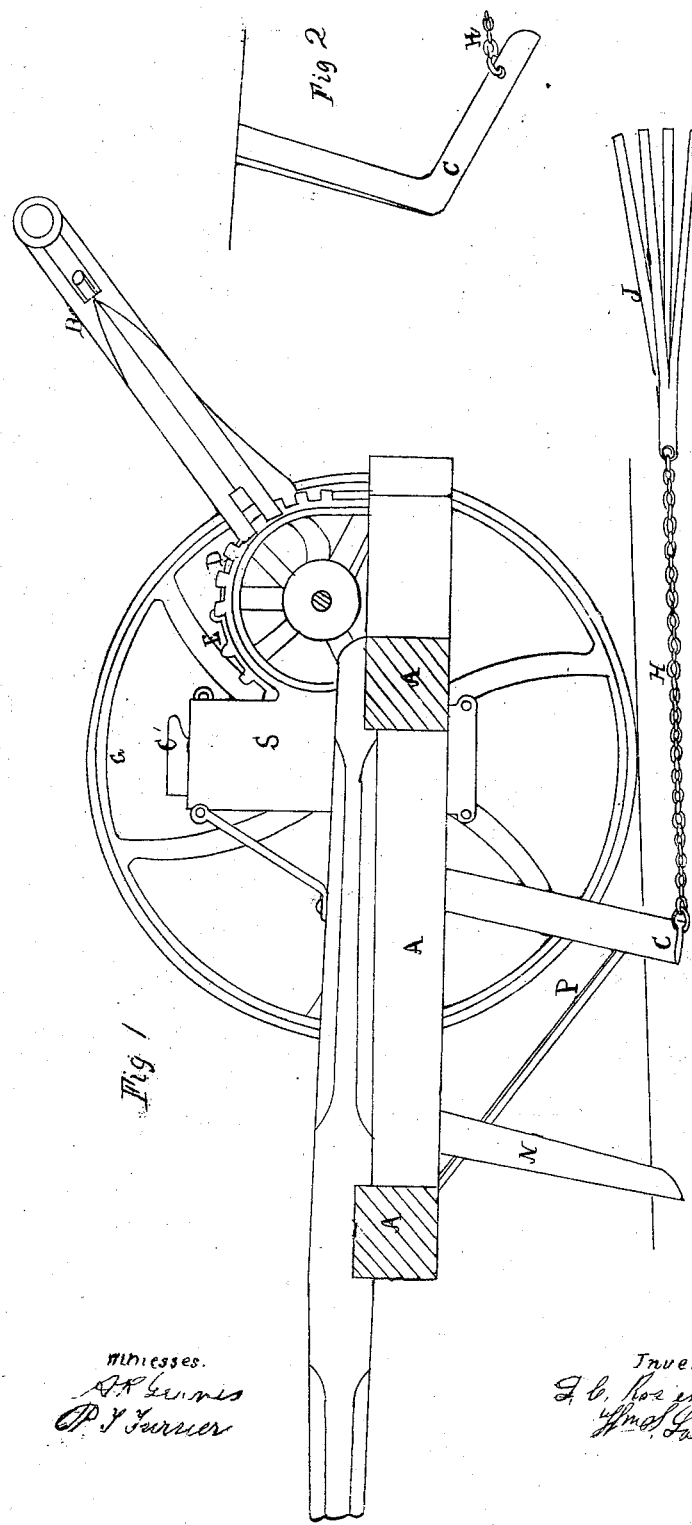

D. C. ROSIER, OF CLARKSON, NEW YORK.

IMPROVEMENT IN MACHINES FOR HARVESTING BEANS.

Specification forming part of Letters Patent No. 58,140, dated September 18, 1866.

*To all whom it may concern:*

Be it known that I, D. C. ROSIER, of Clarkson, in the county of Monroe and State of New York, have invented a new and useful Machine for Harvesting Beans; and I do hereby declare that the following is a full, clear, and exact description thereof, reference being had to the accompanying drawings, making part of this specification, in which—

Figure 1 is a vertical section of my invention, showing the right-hand ground-wheel G, elevating devices, colter, and stalk-cutter C, and its chain and its stirrer or agitator. Fig. 2 is a detached perspective view of the stalk-cutter or knife C, and showing the point at which the chain H is attached.

Like letters indicate like parts in both figures.

This invention consists in the construction of a machine for harvesting beans, with two knives or cutters, one running from each side horizontally, the one being arranged a little to the rear of the other, and made adjustable so as to run below the surface and cut off the stalks of the beans; and, also, in providing each horizontal cutter-blade with a short section of chain, to the end of which is attached a metal shank, having several diverging prongs, which cause a sufficient agitation to effectually separate the bean stalks from the earth without shelling the beans.

To enable others to make and use my invention, I will describe its construction and operation.

I construct a suitable frame, A, which I mount upon two ground-wheels, G, with their elevating-levers B, toothed rack C', stocks S, and segments D and E, such as are commonly used on the wheel-cultivators. These wheels may be arranged one a little to the rear of the other. This permits a similar arrangement of the two L-shaped cutters, C, and at the same time each bear the same relative position to its respective wheel.

The point of the cutters should reach past each other a little, so as to cut the entire width between their vertical shanks, and by arranging one back of the other there is a clearance left between them for any obstructions that would not be cut or pass over or under the knives.

These knives cut the stalks off just below the surface of the ground, at which point they are tender and easily cut, and leave the roots undisturbed.

The chain H and agitator or separator J, attached to each cutter, as shown in the drawings, and which drag along under the stalks, effect an entire separation of them from the earth, and leave them lying upon the surface as evenly spread as they grew, and in the most perfect condition for curing, after which they may be collected into windrows and bunches, preparatory to being drawn and stacked or housed.

The employment of the divider N is found necessary, in order to prevent vines or weeds, &c., from clogging the cutters C, at the junction of the brace-rods P. The point of each cutter should recede somewhat from the edge at the angle.

What I claim as my invention, and desire to secure by Letters Patent, is—

The arrangement of the L-shaped cutters C, in combination with the elevating or adjusting devices, in the manner and for the purposes set forth.

D. C. ROSIER.

Witnesses:
WM. S. LOUGHBOROUGH,
P. T. TURNER.